(12) United States Patent
Cohen

(10) Patent No.: US 11,257,479 B2
(45) Date of Patent: Feb. 22, 2022

(54) CHAT AND KNOWLEDGE DOMAIN DRIVEN TASK-SPECIFIC QUERY AND RESPONSE SYSTEM

(71) Applicant: Cybernet Systems Corp., Ann Arbor, MI (US)

(72) Inventor: Charles J. Cohen, Ann Arbor, MI (US)

(73) Assignee: Cybernet Systems Corp., Ann Arbor, MI (US)

( * ) Notice: Subject to any disclaimer, the term of this patent is extended or adjusted under 35 U.S.C. 154(b) by 61 days.

(21) Appl. No.: 16/653,625

(22) Filed: Oct. 15, 2019

(65) Prior Publication Data

US 2020/0118541 A1   Apr. 16, 2020

Related U.S. Application Data

(60) Provisional application No. 62/744,933, filed on Oct. 12, 2018.

(51) Int. Cl.
*G10L 15/00* (2013.01)
*G10L 13/00* (2006.01)
*H04L 51/02* (2022.01)
*G06F 16/9538* (2019.01)
*G10L 15/18* (2013.01)
*G10L 17/22* (2013.01)

(52) U.S. Cl.
CPC .......... *G10L 13/00* (2013.01); *G06F 16/9538* (2019.01); *G10L 15/18* (2013.01); *G10L 17/22* (2013.01); *H04L 51/02* (2013.01)

(58) Field of Classification Search
CPC ......... G10L 15/22; G10L 15/26; G06F 17/20; G06F 17/28
See application file for complete search history.

(56) References Cited

U.S. PATENT DOCUMENTS

| 6,456,973 B1 * | 9/2002 | Fado | G10L 13/00 345/156 |
| 6,477,437 B1 * | 11/2002 | Hirota | G06Q 10/10 700/108 |
| 6,721,706 B1 * | 4/2004 | Strubbe | G10L 15/18 704/275 |

(Continued)

*Primary Examiner* — Daniel Abebe
(74) *Attorney, Agent, or Firm* — The Law Offices of John G. Posa

(57) ABSTRACT

A system and method has the ability to take information from a wide variety of sources and package it in a form that a user can accesses in a conversationally intuitive manner. Task or knowledge domain-specific knowledge bases acquired from structured and free-text sources, data extracted describing world state, or natural language and spoken language knowledge are used to "intelligently" respond to an operator's or user's verbal or written request for information. In the example of a maintenance system, a user may submit status-related questions, and the system might then verbalize a list of instructions of what further diagnostic information the maintainer should acquire through tests. As the maintainer verbalizes to the system their findings, the system might narrow down its assessment of likely faults and eventually verbalize to the maintainer specific steps, and potentially images and diagrams describing the necessary corrective maintenance. Additional applications are presented in the disclosure.

28 Claims, 3 Drawing Sheets

(56) References Cited

U.S. PATENT DOCUMENTS

| | | | |
|---|---|---|---|
| 9,642,184 B2 * | 5/2017 | Plocher | G10L 15/22 |
| 2008/0154607 A1 * | 6/2008 | Cizio | G05B 19/418 |
| | | | 704/260 |
| 2011/0202351 A1 * | 8/2011 | Plocher | H04L 67/12 |
| | | | 704/275 |
| 2018/0322881 A1 * | 11/2018 | Min | G06F 3/167 |

* cited by examiner

CHAT AND KNOWLEDGE DOMAIN DRIVEN TASK-SPECIFIC QUERY AND RESPONSE SYSTEM

REFERENCE TO RELATED APPLICATIONS

This application claims priority to, and the benefit of, U.S. Provisional Patent Application Ser. No. 62/744,933, filed Oct. 12, 2018, the entire content of which is incorporated herein by reference.

BACKGROUND OF THE INVENTION

A chatbot is an automated system that conducts a conversation via synthesized speech or text. The software is typically designed to mimic a human in a given application space. Chatbots are used to simulate dialog in various systems including customer service or information acquisition. Some chatbots use sophisticated natural language processing, while others scan for keywords and reply based upon the most similar word patterns found is a database.

Chatbots may interact with users in various ways, including standalone programs, telephonic communications and web-based applications. Chatbots are becoming more common due to high-level programming techniques causing specialized technical skills to become less necessary. Indeed, rudimentary chatbots can now be created using Facebook Messenger, and various websites facilitate chatbot creation using simple drag-and-drop interfaces.

Chatbots process inputs through parsing, followed by a series of algorithms to identify and interpret what a user said, to infer what the user might mean or want, and to determine an appropriate response. Although chatbot technology is distinctly different from natural language processing technology, the former can only really advance as quickly as the latter; without continued developments in NLP, chatbots remain at the mercy of algorithms' current ability to detect the subtle nuances in both written and spoken dialogue. Despite these considerable limitations, chatbots are becoming increasingly sophisticated, responsive, and more real.

The following components are applicable to the invention, all of which are incorporated herein by reference:
The Stanford Parser
https://nlp.stanford.edu/software/lex-parser.shtml
The PCFG parser (which also does pos tagging):
Dan Klein and Christopher D. Manning. 2003. Accurate Unlexicalized Parsing. Proceedings of the 41st Meeting of the Association for Computational Linguistics, pp. 423-430.
For the Universal Dependencies representation:
Joakim Nivre, Marie-Catherine de Marneffe, Filip Ginter, Yoav Goldberg, Jan Hajič, Christopher D. Manning, Ryan McDonald, Slav Petrov, Sampo Pyysalo, Natalia Silveira, Reut Tsarfaty, and Daniel Zeman. 2016. Universal Dependencies v1: A Multilingual Treebank Collection. In LREC 2016.
For the English Universal Dependencies converter and the enhanced English Universal Dependencies representation:
Sebastian Schuster and Christopher D. Manning. 2016. Enhanced English Universal Dependencies: An Improved Representation for Natural Language Understanding Tasks. In LREC 2016.
For the (English) Stanford Dependencies REPRESENTATION:
Marie-Catherine de Marneffe, Bill MacCartney and Christopher D. Manning. 2006. Generating Typed Dependency Parses from Phrase Structure Parses. In LREC 2006.
Chatbot/Chatscript
http://brilligunderstanding.com/publications.html
Survey of Chatbots in research (Abdul-Kader, S. A., & Woods, J. (2015). Survey on chatbot design techniques in speech conversation systems. International Journal of Advanced Computer Science and Applications, 6(7), 72-80.): https://thesai.org/Downloads/Volume6No7/Paper_12-Survey_on_Chatbot_Design_Techniques_in_Speech_Conversation_Systems.pdf

SUMMARY OF THE INVENTION

This invention is directed to a system and method that employs task or knowledge domain-specific knowledge bases acquired from structured and free-text sources (example: electronic maintenance manuals, electronic encyclopedic sources, electronic cooking information (cooking instructions or recipes, needed input foods to make a recipe, other cooking considerations, like how the dish might look at different stages of preparation and cooking), data extracted describing world state (such as inventory levels/locations, recommended methods for placement or pick-up, recommend means for item identification and tracking, etc.), or structured descriptions of machine or system operations), and natural language and spoken language knowledge to "intelligently" respond to an operator's or user's verbal or written request for information (by "intelligently" we mean that response is generated by the user's input language and how that language indexes into the domain-specific knowledge-base).

In the example of a maintenance system, the maintainer might ask a system a question like "Why is the engine check light on?" and the system might respond by verbalizing: "The engine check light is on because the engine temperature exceeds safe limits." Then the maintainer might ask "Why is the engine temperature too high?" and the system might say "It could be that engine coolant is too low, or that the coolant pump might be broken, or that there might be a break in the coolant line, or that the oil level is too low . . . " The maintainer might then ask "How do I determine which of these it might be?" and the system might then verbalize a list of instructions of what further diagnostic information the maintainer should acquire through tests.

As the maintainer verbalizes to the system his findings, the system might narrow down its assessment of likely faults and eventually verbalize to the maintainer specific steps (and potentially images and diagrams) describing the necessary corrective maintenance. The system can also prioritize which fault is more likely than others based on past performance, information provided by the manufacturer, from other engine sensors, etc. Note that "speech" is used only so far as it is tuned to the corpus of the input document(s). Text or other methods of inputs (touch screens, etc.) and outputs (screen text, diagrams, images, etc.) also work in the above paradigm.

DETAILED DESCRIPTION OF THE INVENTION

Figure 1:
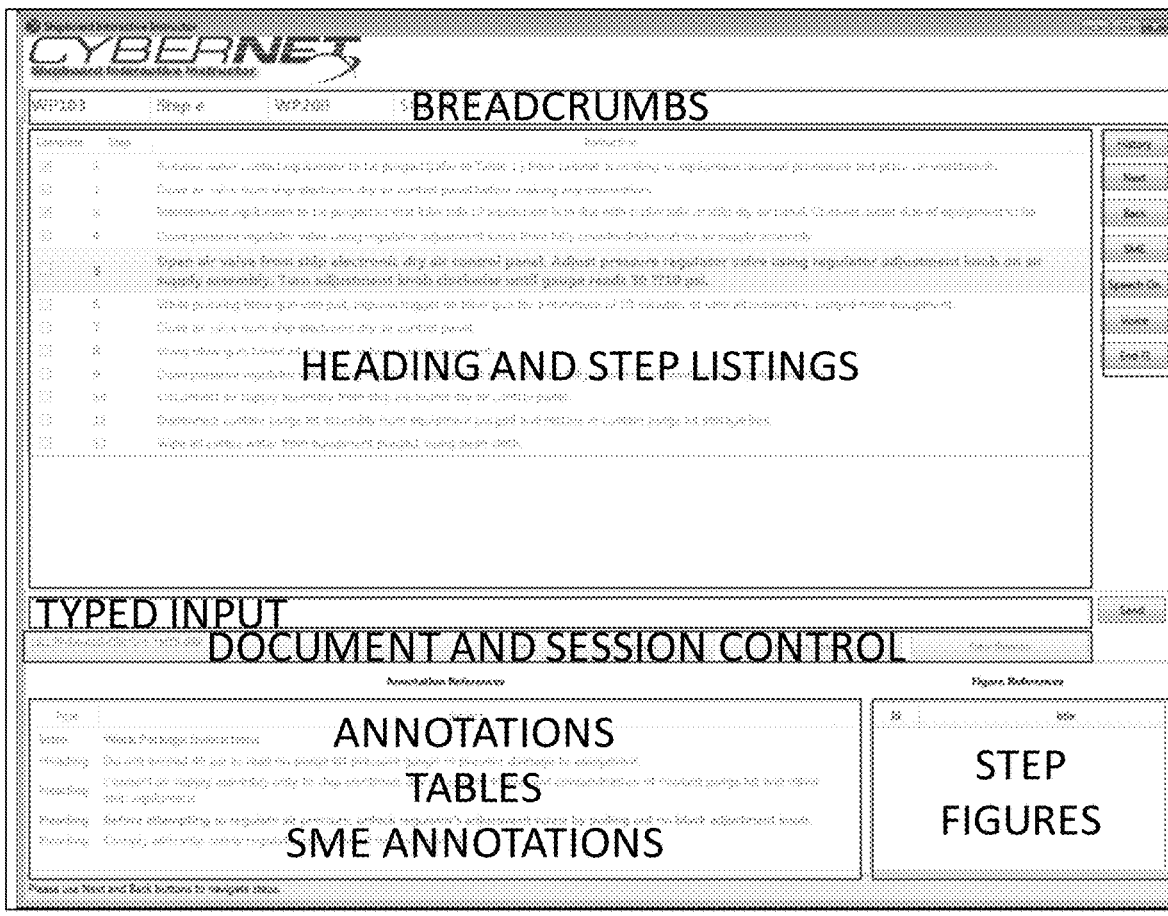
FIG. 1 is a graphical user interface (GUI) applicable to the invention.
Figure 2:
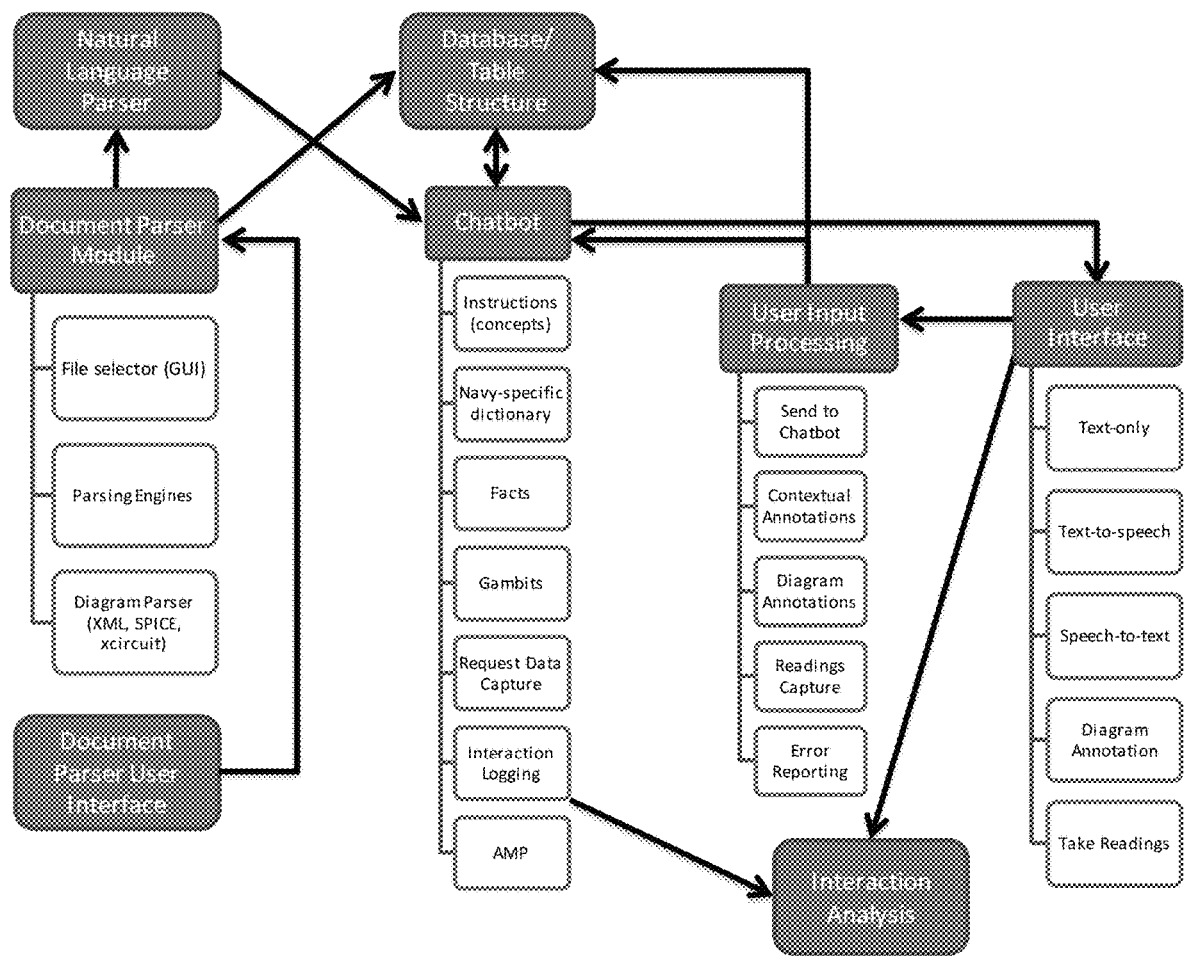
FIG. 2 is a block diagram representative of the system.
Figure 3:
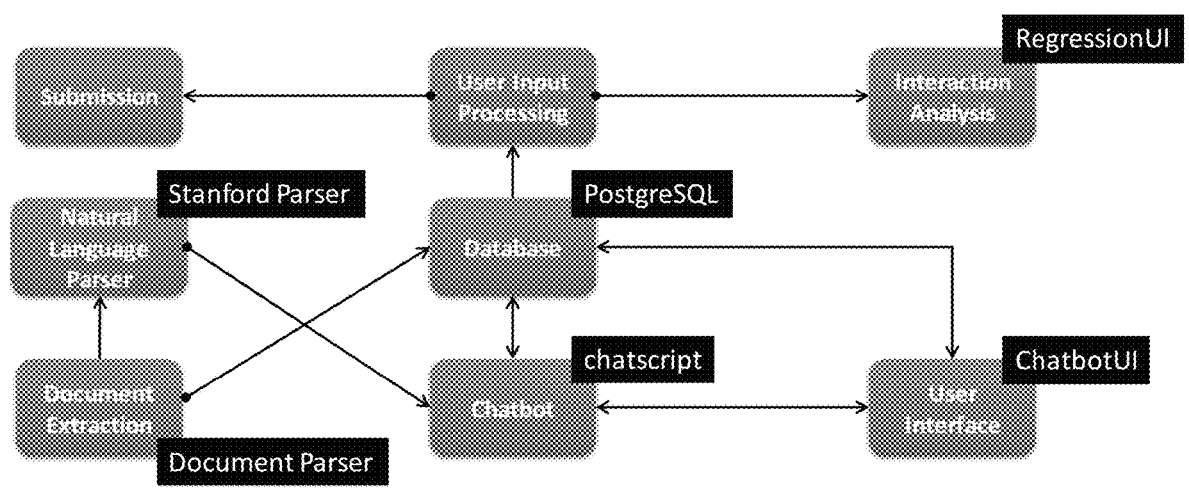
FIG. 3 is a data flow diagram.

The following describes how the parser works, and how the knowledge base is structured. Each document is divided into structure, roughly chapters, section headings, and section content; this is recursive (i.e., a heading is permitted a subheading). The content in each heading is divided into sentences (may be sentence fragments). Each sentence is analyzed with a natural language parser (such as the Stanford Parser). Prior to parsing, known nouns and verbs may be tagged—these are typically going to be corpus specific, such as Navy terms. The result of this parsing provides structure and usage of the words in the sentence (note: the parsed structure provides proximity information based on word position).

From the above, a parsed structure is created: we link nouns and verbs together (NOUN-VERB pairs), NOUNS together (by proximity), nouns together (as COMPOUND NOUNS). The chatbot is configured to utilize the parsed structure such that input phrases (stimuli) create relevant response that is related to identifying headings that are important.

The full-text document parser uses XML as its primary input document format. Conversion to XML of any non-XML document can be provided by third-party software. Once the documents are in XML format, we extract specific sections. The basic process is as follows:
1. Select Document
2. Associate cross-reference calls to step and header locations
3. For each package in document:
   a. Extract package heading information
   b. Assign ID and link in cross-reference table
   c. Extract notes, cautions, warnings
   d. Extract tables specific to package heading
   e. For each subheading (maximum depth 1):
      i. Assign ID and link in cross-reference table (if necessary)
      ii. Extract subheading figures
      iii. Extract subheading tables
      iv. Extract step notes, cautions, and warnings
      v. Extract itemized lists
      vi. Extract steps
         1. Assign ID and link in cross-reference table (if necessary)
         2. Extract step notes, cautions, and warnings
         3. Extract step tables
         4. Extract substeps and repeat (1)(e)(vi)
   f Extract ORTS lookup (specific to certain document types)
   g. Convert cross-references into human-readable format (e.g., convert a step ID to "step 1")
   h. Extract glossary tables (if applicable)

The following section describes how the speech system and alternative text parser operate, and how both are integrated into the system.

The speech system is CONFIGURED by the results of the document parsing. The determined key corpus (verbs, nouns) are used to tune the speech recognition engine to recognize terms specific to the corpus. During the parsing of the Stanford Parser output, we look for dependency tags (as established by the Stanford parser, these are, nsubj, nsubjpass, dobj, compound, and amod, a different natural language parser may provide a different, but equivalent, tagging mechanism) to identify words that should be grouped together. These grouped words are tracked by work package headings and all sentences within a particular work package to link the concepts of a work package into a single searchable unit. (These dependency tags show how words specifically relate to each other (ex: vmod means verb modifier). Info on these dependencies can be found here: https://nlp.stanford.edu/software/dependencies_manual.pdf)

The chatbot is configured with query syntaxes that identify specific questions (e.g., "How do I change a tire?" "How do I fix a flat?") and statements (e.g., "I want to change a tire." "Find change tire."). The query syntaxes identify the verbs and nouns in the user's query and identifies matches to the dependency tags that best fit.

Chatscript utilizes "concepts", a word matching mechanism, in which verbs and nouns are searched based on similarity. A "concept" is similar to a synonym, but word synonyms have essentially equivalent meaning, while Chatscript concepts group based on language usage and intent). For example, the word "change" could be substituted with "fix" or "substitute." Tire is a "wheel" and possibly a generic automobile part concept.

Once all the concept matches have been evaluated against the database of matched verbs and nouns, relevant headings are identified that have concept-matched word combinations. The user is then given a selection of topics (headings) that are highly matched to the query.

A key point of novelty associated with the system involves the ability to create a chatbot that is based on the actual language used in one or more specific documents related to a subject area (car maintenance, a school subject, ordering a product online). Our system, which is using the Natural Language Parser (NLP), takes those documents, pulls the specific details out of the document and repackages it in a form so that the associated chatbot and/or User Interface can use that information. This allows a person to interact with that data in a more natural and intuitive manner, similar to how humans would interact conversationally.

EXAMPLE

In the following example, assume you own a specific brand of dishwasher equipped with a system constructed in accordance with this invention. This means that:
  It has a microphone so it can hear your questions.
  It has a speech synthesizer so it can verbally respond.
  It has a chatbot with associated database that already has the manual fed into it.
  It has an internet connection and can review conversations online (reviews, discussions, questions and answers) about that specific make and model of the dishwasher
Given the above, the subject dishwasher is operative to perform the following functions:
  The owner can ask the dishwasher, "Did I add detergent?" The onboard sensors will determine the state and respond.
  The owner can ask the dishwasher, "How do I perform maintenance?" and the dishwasher can verbally guide the person to clean the inside, step by step.
  The owner can verbally give it any commands the dishwasher normally has through buttons, and more. "Dishwasher, pause!" "Dishwasher, start in 4 hours." "Dishwasher, use the gentle cycle."
  The owner can ask, "Dishwasher, my are my glasses spotty?" Based on the online information, the dishwasher would recommend a specific setting and type of detergent to solve that problem.

In broad and general terms, the invention has the ability to take information from a wide variety of sources and package it in a form that a person can accesses in a conversationally intuitive manner.

The invention claimed is:

1. A system implementing a human-machine interface, comprising:
 a consumer or industrial product including operational components implementing functions other than computation;
 a microphone, speaker and control electronics disposed on or in the consumer or industrial product; and
 wherein the control electronics includes a processor and memory storing a software program enabling the control electronics to perform the following functions:
  perform a speech recognition function to interpret verbal commands and queries received from a user through the microphone, and wherein the verbal commands and queries relate to the functioning or maintenance of the consumer or industrial product;
  implement a chatbot using an associated database stored in the memory to analyze the verbal commands and queries and formulate responses thereto,
  perform a voice synthesis function to deliver the formulated responses in spoken form to the user through the speaker,
  develop an assessment of likely faults associated with consumer or industrial product based on the verbal commands and queries received from a user, and
  verbalize specific steps or present images or diagrams to the user describing corrective maintenance.

2. The system of claim 1, further including an Internet interface, and wherein the control electronics is further operative to automatically search and download online information for use in formulating responses to the verbal commands and queries received from a user regarding the functioning or maintenance of the consumer or industrial product.

3. The system of claim 1, wherein the associated database includes an operational or maintenance manual associated with the consumer or industrial product.

4. The system of claim 1, wherein the associated database includes information regarding the make and model of the consumer or industrial product.

5. The system of claim 1, wherein the verbal commands and queries received from a user and the response thereto comprise a natural language conversation.

6. The system of claim 1, wherein the consumer or industrial product is one of the following:
 an appliance;
 audio or video equipment;
 a vehicle; or
 other consumer, commercial or industrial equipment.

7. The system of claim 1, wherein the associated database includes structured and free-text sources.

8. A system implementing a human-machine interface, comprising:
 a consumer or industrial product including operational components implementing functions other than computation;
 a microphone, speaker and control electronics disposed on or in the consumer or industrial product; and
 wherein the control electronics includes a processor and memory storing a software program enabling the control electronics to perform the following functions:
  perform a speech recognition function to interpret verbal commands and queries received from a user through the microphone, and wherein the verbal commands and queries relate to the functioning or maintenance of the consumer or industrial product;
  implement a chatbot using an associated database stored in the memory to analyze the verbal commands and queries and formulate responses thereto,
  perform a voice synthesis function to deliver the formulated responses in spoken form to the user through the speaker, and
  determine a likely fault based on past performance of the consumer or industrial product.

9. The system of claim 8, further including an Internet interface, and wherein the control electronics is further operative to automatically search and download online information for use in formulating responses to the verbal commands and queries received from a user regarding the functioning or maintenance of the consumer or industrial product.

10. The system of claim 8, wherein the associated database includes an operational or maintenance manual associated with the consumer or industrial product.

11. The system of claim 8, wherein the associated database includes information regarding the make and model of the consumer or industrial product.

12. The system of claim 8, wherein the verbal commands and queries received from a user and the response thereto comprise a natural language conversation.

13. The system of claim 8, wherein the consumer or industrial product is one of the following:
 an appliance;
 audio or video equipment;
 a vehicle; or
 other consumer, commercial or industrial equipment.

14. The system of claim 8, wherein the associated database includes structured and free-text sources.

15. A system implementing a human-machine interface, comprising:
 a consumer or industrial product including operational components implementing functions other than computation;
 a microphone, speaker and control electronics disposed on or in the consumer or industrial product; and
 wherein the control electronics includes a processor and memory storing a software program enabling the control electronics to perform the following functions:
  perform a speech recognition function to interpret verbal commands and queries received from a user through the microphone, and wherein the verbal commands and queries relate to the functioning or maintenance of the consumer or industrial product;
  implement a chatbot using an associated database stored in the memory to analyze the verbal commands and queries and formulate responses thereto,
  perform a voice synthesis function to deliver the formulated responses in spoken form to the user through the speaker, and
  determine a likely fault based on information provided by the manufacturer of the consumer or industrial product.

16. The system of claim 15, further including an Internet interface, and wherein the control electronics is further operative to automatically search and download online information for use in formulating responses to the verbal commands and queries received from a user regarding the functioning or maintenance of the consumer or industrial product.

17. The system of claim 15, wherein the associated database includes an operational or maintenance manual associated with the consumer or industrial product.

18. The system of claim 15, wherein the associated database includes information regarding the make and model of the consumer or industrial product.

19. The system of claim 15, wherein the verbal commands and queries received from a user and the response thereto comprise a natural language conversation.

20. The system of claim 15, wherein the consumer or industrial product is one of the following:
   an appliance;
   audio or video equipment;
   a vehicle; or
   other consumer, commercial or industrial equipment.

21. The system of claim 15, wherein the associated database includes structured and free-text sources.

22. A system implementing a human-machine interface, comprising:
   a consumer or industrial product including operational components implementing functions other than computation;
   a microphone, speaker and control electronics disposed on or in the consumer or industrial product; and
   wherein the control electronics includes a processor and memory storing a software program enabling the control electronics to perform the following functions:
      perform a speech recognition function to interpret verbal commands and queries received from a user through the microphone, and wherein the verbal commands and queries relate to the functioning or maintenance of the consumer or industrial product;
      implement a chatbot using an associated database stored in the memory to analyze the verbal commands and queries and formulate responses thereto,
      perform a voice synthesis function to deliver the formulated responses in spoken form to the user through the speaker, and
      determine a likely fault associated with the consumer or industrial product based upon a sensor input.

23. The system of claim 22, further including an Internet interface, and wherein the control electronics is further operative to automatically search and download online information for use in formulating responses to the verbal commands and queries received from a user regarding the functioning or maintenance of the consumer or industrial product.

24. The system of claim 22, wherein the associated database includes an operational or maintenance manual associated with the consumer or industrial product.

25. The system of claim 22, wherein the associated database includes information regarding the make and model of the consumer or industrial product.

26. The system of claim 22, wherein the verbal commands and queries received from a user and the response thereto comprise a natural language conversation.

27. The system of claim 22, wherein the consumer or industrial product is one of the following:
   an appliance;
   audio or video equipment;
   a vehicle; or
   other consumer, commercial or industrial equipment.

28. The system of claim 22, wherein the associated database includes structured and free-text sources.

\* \* \* \* \*